United States Patent
Zhang et al.

(10) Patent No.: US 9,851,004 B2
(45) Date of Patent: Dec. 26, 2017

(54) METHOD OF CONTROLLING A VARIATOR

(71) Applicant: GM GLOBAL TECHNOLOGY OPERATIONS LLC, Detroit, MI (US)

(72) Inventors: Zhen J. Zhang, West Bloomfield, MI (US); Jesse B. Bradley, Royal Oak, MI (US); Joseph B. Burtch, Lake Orion, MI (US); John E. Marano, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 648 days.

(21) Appl. No.: 14/290,106

(22) Filed: May 29, 2014

(65) Prior Publication Data

US 2015/0345631 A1    Dec. 3, 2015

(51) Int. Cl.
*F16H 61/662* (2006.01)
*F16H 9/12* (2006.01)

(52) U.S. Cl.
CPC ....... *F16H 61/66272* (2013.01); *F16H 9/125* (2013.01); *F16H 2061/66218* (2013.01); *F16H 2061/66277* (2013.01)

(58) Field of Classification Search
CPC .............. F16H 61/66272; F16H 9/125; F16H 61/0206; F16H 61/6648; F16H 15/38; F16H 61/66
See application file for complete search history.

(56) References Cited

U.S. PATENT DOCUMENTS

| | | | |
|---|---|---|---|
| 8,812,206 B2* | 8/2014 | Totsuka | F16H 61/66272 474/28 |
| 9,033,831 B2* | 5/2015 | Kawakami | F16H 55/56 474/18 |
| 9,163,722 B2* | 10/2015 | Yamada | F16H 61/0025 |
| 9,422,951 B2* | 8/2016 | Inagaki | F15B 11/16 |
| 2007/0060441 A1 | 3/2007 | Kim et al. | |
| 2012/0108374 A1* | 5/2012 | Doihara | F16H 61/66272 474/28 |
| 2012/0258825 A1* | 10/2012 | Kodama | F16H 61/66272 474/69 |
| 2014/0128187 A1* | 5/2014 | Iraha | F16H 61/0206 474/8 |

(Continued)

FOREIGN PATENT DOCUMENTS

CN    102084154 A    6/2011
JP    4878972 B2    2/2012

*Primary Examiner* — William E Dondero
*Assistant Examiner* — Mark K Buse
(74) *Attorney, Agent, or Firm* — Quinn IP Law

(57) ABSTRACT

A method of controlling a variator that requires clamping pressure between a first component and a second component to transfer torque therebetween, such as a continuously variable transmission, includes calculating a theoretical clamping pressure, and multiplying the theoretical clamping pressure by a multiplier to define a commanded clamping pressure. The multiplier includes a value that is variable between a minimum multiplier value and a maximum multiplier value. The value of the multiplier is based on current operating conditions of the variator. The commanded clamping pressure is applied to the first component and the second component to generate friction and transfer torque between the first component and the second component.

18 Claims, 1 Drawing Sheet

(56) References Cited

U.S. PATENT DOCUMENTS

| | | | |
|---|---|---|---|
| 2015/0308570 A1* | 10/2015 | Van Der Sluis | F16H 1/0206 474/23 |
| 2015/0316149 A1* | 11/2015 | Van Wijk | F16H 61/66272 474/28 |
| 2015/0345632 A1* | 12/2015 | Van Der Sluis | F16H 61/0206 474/28 |
| 2015/0369363 A1* | 12/2015 | Kanehara | F16H 61/0021 474/28 |
| 2016/0017993 A1* | 1/2016 | Yagasaki | F16H 9/125 701/58 |
| 2016/0017994 A1* | 1/2016 | Suzumura | F16H 61/688 701/55 |

* cited by examiner

METHOD OF CONTROLLING A VARIATOR

TECHNICAL FIELD

The invention generally relates to a method of controlling a variator, such as continuously variable transmission, that requires a clamping pressure between a first component and a second component to transfer torque between the first component and the second component.

BACKGROUND

A variator is a mechanical device that changes operating parameters, or changes operating parameters of another device. An example of a variator is a Continuously Variable Transmission (CVT), which is a mechanical power transmission device for transmitting torque from an engine to an output, such as a wheel. The CVT is capable of continuously changing between an infinite number of gear ratios. Often, the variator includes a first component, such as a belt, that is compressed by a second component, such as between two sheaves of a variable width pulley, to transfer torque therebetween.

A clamping force may be applied to at least one of the components of the variator, e.g., the variable width pulley, to compress the belt between sheaves of the variable width pulley and generate friction therebetween. Setting the clamping force too low may allow slippage between the components of the variator, e.g., between the belt and the sheaves of the variable width pulley. Setting the clamping force too high may reduce the efficiency of the variator.

SUMMARY

A method of controlling a variator is provided. The variator requires a clamping pressure between a first component and a second component to transfer torque between the first component and the second component. The method includes calculating a theoretical clamping pressure, and multiplying the theoretical clamping pressure by a multiplier to define a commanded clamping pressure. The multiplier includes a value that is variable between a minimum multiplier value and a maximum multiplier value. The value of the multiplier is based on current operating conditions of the variator. The commanded clamping pressure is applied to the first component and the second component to generate friction and transfer torque between the first component and the second component.

A method of controlling a continuously variable transmission is also provided. The continuously variable transmission includes a primary pulley, a secondary pulley, and a belt rotating continuously about the primary pulley and the secondary pulley. Each of the primary pulley and the secondary pulley includes an axially fixed sheave, and an axially moveable sheave. The method includes calculating a theoretical clamping pressure. A multiplier is defined based on current operating conditions of at least one of the primary pulley and the secondary pulley. The multiplier includes a value that is variable between a minimum multiplier value and a maximum multiplier value. The theoretical clamping pressure is multiplied by the defined value of the multiplier to define a commanded clamping pressure. The commanded clamping pressure is applied to at least one of the primary pulley and the secondary pulley to compress the belt between the respective axially moveable sheave and the axially fixed sheave at the commanded clamping pressure, to transfer torque therebetween.

Accordingly, by varying the value of the multiplier, the commanded clamping force is changed. The commanded clamping force is changed to account for the current operating conditions of the variator (e.g., the continuously variable transmission). The value of the multiplier is set low when the variator is operating at a steady-state condition, such as when a gear ratio of the variator remains substantially constant and is not changing. When the variator is operating at a low rotational speed, or when the gear ratio of the variator is changing, then the value of the multiplier may be increased to increase the commanded clamping pressure. The amount that the value of the multiplier is increased may be based on the rate of change of the gear ratio. For example, a higher rate of change of the gear ratio may require a higher commanded clamping force. As such, the value of the multiplier may be increased to a higher level when the rate of change of the gear ratio is high. By varying the value of the multiplier, the commanded clamping force is changed to accommodate the current operating conditions of the variator. As such, slippage between the components of the variator may be minimized under high stress operating conditions, and the energy efficiency of the variator may be maximized under low stress operating conditions.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims. Furthermore, the invention may be described herein in terms of functional and/or logical block components and/or various processing steps. It should be realized that such block components may be comprised of any number of hardware, software, and/or firmware components configured to perform the specified functions.

Figure 1:
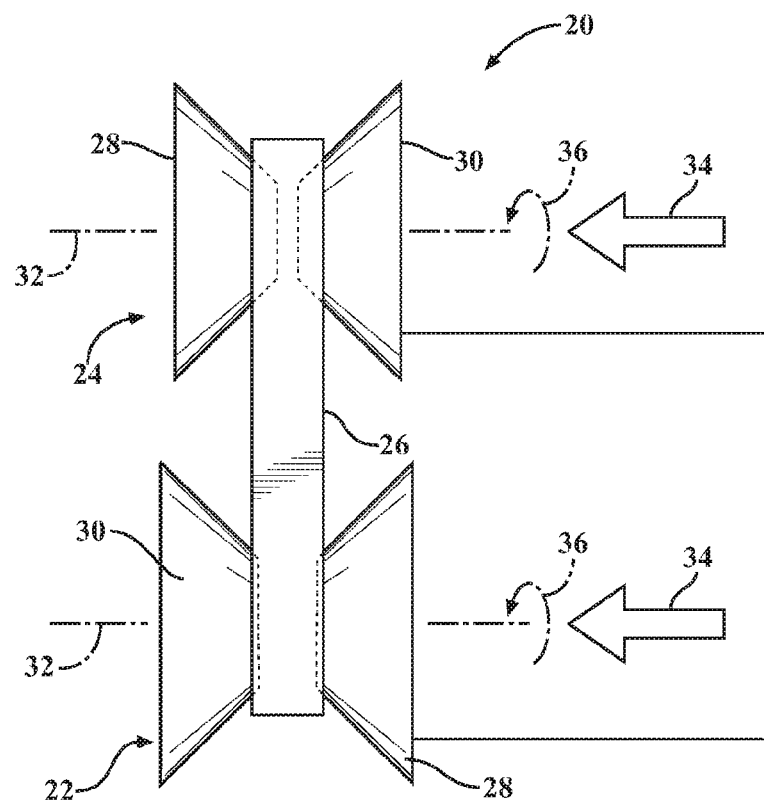
FIG. 1 is a schematic plan cross sectional view of a variator, shown as a continuously variable transmission.

Referring to the Figures, wherein like numerals indicate like parts throughout the several views, a variator is generally shown at 20 in FIG. 1. The variator 20 is a mechanical device that changes operating parameters, or changes operating parameters of another device. The variator 20 may include any device that includes a first component and a second component, and requires a clamping pressure between the first component and the second component to transfer torque between the first component and the second component. Referring to FIG. 1, the variator 20 is shown embodied as a continuously variable transmission. In general, a continuously variable transmission is a transmission that can change steplessly through an infinite number of effective gear ratios between a maximum gear ratio and a minimum gear ratio.

Referring to FIG. 1, the continuously variable transmission includes a primary pulley 22, a secondary pulley 24, and a belt 26 rotating continuously about the primary pulley 22 and the secondary pulley 24. The first component may be defined as one of the primary pulley 22 or the secondary pulley 24, and the second component may be defined as the belt 26.

As is known in the art, each of the primary pulley 22 and the secondary pulley 24 includes an axially fixed sheave 28 and an axially moveable sheave 30. The axially moveable sheave 30 may move toward or away from the axially fixed sheave 28 along a central rotation axis 32 of the respective primary pulley 22 or the secondary pulley 24. The belt 26 runs between the two pulleys, with the axially fixed sheave 28 and the axially moveable sheave 30 of each of the primary pulley 22 and the secondary pulley 24 sandwiching or compressing the belt 26 therebetween, in response to the clamping pressure, generally indicated by force arrows 34. Frictional engagement between the respective sheaves of each of the primary pulley 22 and the belt 26, and between the respective sheaves of the secondary pulley 24 and the belt 26 couples the belt 26 to each of the primary pulley 22 and the secondary pulley 24, to transfer a torque from the primary pulley 22 to the secondary pulley 24. Typically, the primary pulley 22 functions as a drive pulley to receive a torque from a power source, such as an engine, with the secondary pulley 24 being driven by the primary pulley 22 via the belt 26. Both the primary pulley 22 and the secondary pulley 24 rotate about their respective rotation axis 32 at a variable rotational speed, generally indicated by rotation arrows 36. Accordingly, each of the primary pulley 22 and the secondary pulley 24 may be defined as a rotatable device. The gear ratio of the continuously variable transmission is the ratio of the torque of the primary pulley 22 to the torque of the secondary pulley 24. The gear ratio may be changed by moving the respective sheaves of one of the pulleys closer together and the respective sheaves of the other pulley farther apart, causing the belt 26 to ride higher or lower on the respective pulley.

The variator 20 may further include a control module 38, such as but not limited to a transmission control unit, to control the operation of the variator 20, e.g., the continuously variable transmission. The control module 38 may include a computer and/or processor, and include all software, hardware, memory, algorithms, connections, sensors, etc., necessary to manage and control the operation of the variator 20. As such, a method described below may be embodied as a program operable on the control module 38. It should be appreciated that the control module 38 may include any device capable of analyzing data from various sensors, comparing data, making the necessary decisions required to control the operation of the variator 20, and executing the required tasks necessary to control the operation of the variator 20. The control module 38 is operable to perform the various tasks of the method described below.

The method of controlling the variator 20, such as but not limited to the continuously variable transmission shown in FIG. 1, is described below. As noted above, the variator 20 requires a clamping pressure 34 between a first component and a second component to transfer torque between the first component and the second component. With reference to the continuously variable transmission shown in FIG. 1, and as noted above, the first component may be defined as one of the primary pulley 22 or the secondary pulley 24, and the second component may be defined as the belt 26.

Figure 2:
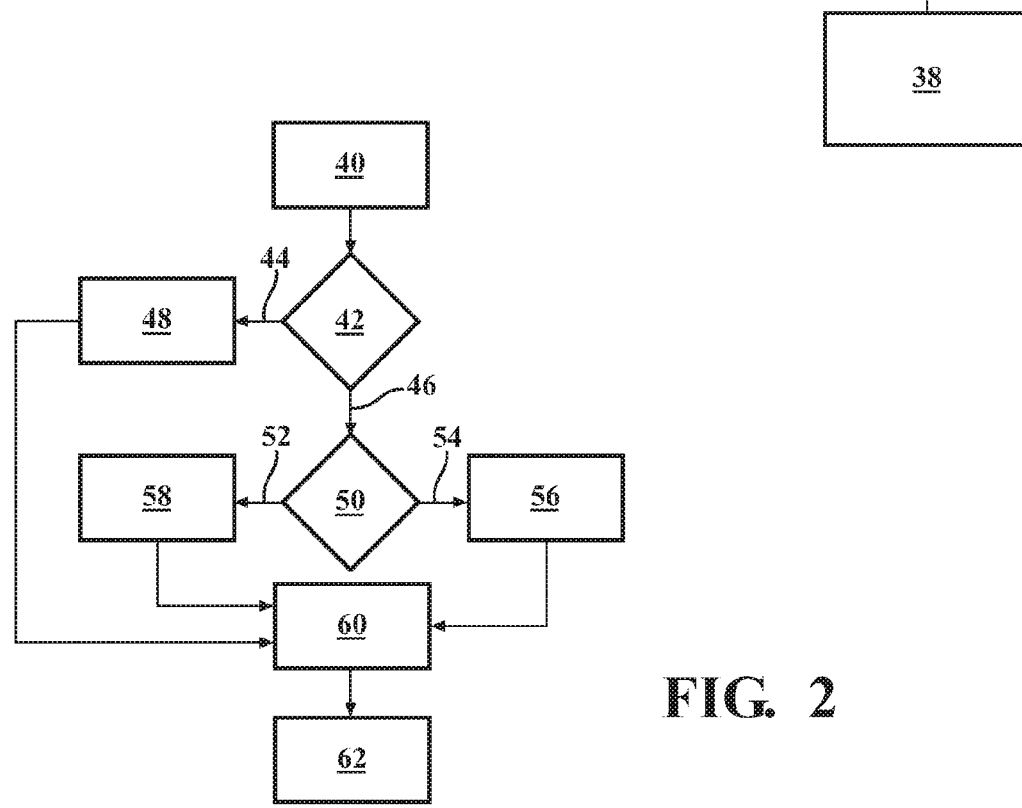
FIG. 2 is a flowchart showing a method of controlling a variator.

Referring to FIG. 2, the method includes calculating a theoretical clamping pressure, generally indicated by box 40. The theoretical clamping pressure is the clamping pressure required between the first component and the second component to transfer torque therebetween, without the occurrence of substantial slip therebetween. With reference to the exemplary embodiment of the continuously variable transmission, the theoretical clamping pressure may include the required clamping pressure between one of the primary pulley 22 and the belt 26, or the secondary pulley 24 and the belt 26, sufficient to transfer torque therebetween without relative slipping. The theoretical clamping pressure is dependent upon the specific shape and design of the first component and the second component, e.g., the primary pulley 22 and the belt 26, as well as the intended purpose and operating conditions of the variator 20. The theoretical clamping pressure may be calculated in any suitable manner. For example, the minimum theoretical clamping pressure may be calculated from Equation 1:

$$P\min = \frac{\lfloor F_{min} - F_{centrifigul} \rfloor}{A_{piston}} \qquad 1)$$

Wherein $P_{min}$ is the minimum clamping pressure; $F_{min}$ is the minimum clamping force; $F_{centrifugal}$ is the centrifugal force, and $A_{piston}$ is the area of the piston applying the clamping force.

The minimum clamping force $F_{min}$ may be calculated from Equation 2:

$$F_{min} = \frac{(T_i)(\cos \alpha)}{(2)(\mu)(R_p)} \qquad 2)$$

Wherein Ti is the input torque; a is the sheave angle; μ is a friction coefficient; and $R_p$ is the radius of the pulley.

Once the theoretical clamping pressure is calculated, a multiplier for the theoretical clamping pressure is defined. The multiplier includes a value that is variable between a minimum multiplier value, and a maximum multiplier value. The value of the multiplier is based on the current operating conditions of the variator 20. The minimum multiplier value may be equal to a value of 1.1, and the maximum multiplier value may be equal to a value of 1.4. However, it should be appreciated that that the values provided herein for the minimum multiplier value and the maximum multiplier values are merely exemplary, and may differ from the exemplary values disclosed herein.

The value of the multiplier is defined based on the current operating conditions of the variator 20. The current operating conditions of the variator 20 may include, but are not limited to, a rate of change in the gear ratio of the variator 20, e.g., the continuously variable transmission, or a rotational speed of the first component, e.g., the primary pulley 22 or the secondary pulley 24. Accordingly, the value of the multiplier may be defined based on the rate of change of the gear ratio of the variator 20. Similarly, the value of the multiplier may be defined based on the rotational speed of one of the components of the variator 20, such as the first component, e.g., the primary pulley 22 or the secondary pulley 24.

As noted above, one or more of the components of the variator 20 may be defined as a rotatable device that rotates about an axis at a rotational speed. For example, either the primary pulley 22 or the secondary pulley 24 of the continuously variable transmission may be defined as a rotatable device. Because rotational speeds of the rotatable devices of the variator 20 may be difficult to accurately measure when low, the multiplier may be defined to equal a higher value to ensure that no slippage occurs between the first component and the second component. The control module 38 may determine, generally indicated by box 42, whether the rotatable device is rotating at or below a pre-defined rotational speed, generally indicated at 44, or is rotating above a pre-defined rotational speed, generally indicated at 46. For example, the pre-defined rotational speed of the rotatable device may be defined to equal 110 rpm. However, it should be appreciated that the pre-defined rotational speed may be defined as any rotational speed, and is dependent upon the specific design and operation of the variator 20. Accordingly, the value of the pre-defined rotational speed noted above is provide merely for exemplary purposes, and should not be considered as limiting. When the rotational speed of the rotatable device is equal to or less than a pre-defined rotational speed, generally indicated at 44, the value of the multiplier may be defined to equal the maximum multiplier value, generally indicated by box 48.

When the rotatable device is rotating at a rotational speed that is greater than the pre-defined rotational speed, generally indicated at 46, then the control module 38 may determine, generally indicated by box 50, if a rate of change of the gear ratio of the variator 20 is substantially equal to zero, generally indicated at 52, or is greater than zero, generally indicated at 54.

When the rate of change of the gear ratio of the variator 20 is greater than zero, generally indicated at 54, then the control module 38 defines the value of the multiplier based on the rate of change of the gear ratio, generally indicated by box 56. In order to define the value of the multiplier based on the rate of change of the gear ratio of the variator 20, the rate of change of the gear ratio of the variator 20 must first be determined. The rate of change of the gear ratio may be defined as the magnitude of change in the gear ratio over a given period of time. As such, a large change in the gear ratio over a given period of time would have a larger rate of change than a small change in the gear ratio over the same period of time. The rate of change of the gear ratio of the variator 20 may be determined in any suitable manner. For example, the gear ratio of the variator 20 may be monitored, sensed, and/or measured over a period of time, and the change in the magnitude of the gear ratio over that period of time may be used to determine the rate of change of the gear ratio. It should be appreciated that the variator 20 and/or the control module 38 may include any sensors, timers, algorithms, etc., necessary to determine the rate of change of the gear ratio of the variator 20.

A higher rate of change of the gear ratio may require a higher clamping pressure between the first component and the second component of the variator 20 to ensure that no slippage between the first component and the second component. The value of the multiplier is dependent upon the actual rate of change of the gear ratio. As such, the value of the multiplier may be defined to include a higher value when the rate of change of the gear ratio is faster or higher, and may be defined to include a lesser value when the rate of change of the gear ratio is slower or lower. Accordingly, the value of the multiplier is defined to include a higher value when the rate of change of the gear ratio is higher. If the rate of change of the gear ratio is lower, than the value of the multiplier is defined as a lesser value. The value of the multiplier is defined to include a higher value as the rate of change of the gear ratio increases. Therefore, as the rate of change of the gear ratio increases, the value of the multiplier moves toward the maximum multiplier value. When the rate of change of the gear ratio is smaller, i.e., when the gear ratio is changing magnitude little over time, then there is less risk of slipping between the first component and the second component, and the clamping force may be less than when the rate of change of the gear ratio is high. Therefore, the value of the multiplier may be considered a sliding scale, in which the value is nearer the minimum multiplier value when the rate of change of the gear ratio is small, and moves toward the maximum multiplier value as the rate of change of the gear ratio increases.

When the rate of change of the gear ratio is substantially equal to zero (0), generally indicated at 52, then the value of the multiplier based on the rate of change of the gear ratio of the variator 20 may be defined to equal the minimum multiplier value, e.g., 1.1, generally indicated by box 58. Because the variator 20 may be continuously adjusted in minute or small increments during the operation thereof, it should be appreciated that the gear ratio may continuously change, but that the change may be so small as to be insignificant relative to the required clamping pressure. Accordingly, as used herein, the term "substantially equal to zero" should be interpreted as near zero, but may include a value slightly more than zero.

The theoretical clamping pressure is then multiplied by the value of the multiplier (defined in one of boxes 48, 56, or 58) to define a commanded clamping pressure, generally indicated by box 60. Accordingly, the value of the commanded clamping pressure is dependent upon the value of the multiplier. The higher the value of the multiplier, the higher the value of the commanded clamping pressure. The lower the value of the multiplier, the closer the commanded clamping pressure is to the theoretical clamping pressure.

The commanded clamping pressure is then applied to the first component and the second component to generate friction and transfer torque therebetween, generally indicated by box 62. For example, referring to the exemplary embodiment of the continuously variable transmission, the commanded clamping pressure may be applied to the axially moveable sheave 30 of one of the first primary pulley 22 and the secondary pulley 24 to compress the belt 26 between the respective axially moveable sheave 30 and the axially fixed sheave 28 at the commanded clamping pressure.

The possibility of slippage between the first component and the second component of the variator 20 decreases as the applied clamping pressure, i.e., the commanded clamping pressure, increases. Accordingly, a higher commanded clamping pressure reduces the possibility of the first component and the second component slipping relative to each other. However, the higher the applied clamping pressure, i.e., the commanded clamping pressure, the less efficient the variator 20 may be. Accordingly, a higher commanded clamping pressure reduces efficiency of the variator 20, whereas a lower commanded clamping pressure increases efficiency of the variator 20. By using the multiplier to adjust the value of the commanded clamping pressure, based on the actual operating conditions of the variator 20, the commanded clamping pressure may be set to a high level when the risk of slippage between the first component and the second component is high to prevent damage caused by slipping, and may be set to a lower level when the risk of slippage between the first component and the second component is low, to increase the efficiency of the variator 20.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a variator that requires a clamping pressure between a first component and a second component of the variator to transfer torque between the first component and the second component, the method comprising:
   calculating a theoretical clamping pressure;
   multiplying the theoretical clamping pressure by a multiplier to define a commanded clamping pressure, wherein the multiplier includes a value that is variable between a minimum multiplier value and a maximum multiplier value based on current operating conditions of the variator; and
   applying the commanded clamping pressure to the first component and the second component to generate friction and transfer torque therebetween.

2. The method as set forth in claim 1 further comprising defining the value of the multiplier based on the current operating conditions of the variator.

3. The method as set forth in claim 2 wherein the variator includes a variable gear ratio, and wherein defining the value of the multiplier based on the current operating conditions of the variator is further defined as defining the value of the multiplier based on a rate of change of the gear ratio of the variator.

4. The method as set forth in claim 3 further comprising determining the rate of change of the gear ratio of the variator.

5. The method as set forth in claim 3 wherein defining the value of the multiplier based on the rate of change of the gear ratio is further defined as defining the value of the multiplier to include a higher value as the rate of change of the gear ratio increases.

6. The method as set forth in claim 3 wherein defining the value of the multiplier based on the rate of change of the gear ratio is further defined as defining the value of the multiplier to include a lesser value as the rate of change of the gear ratio decreases.

7. The method as set forth in claim 3 wherein defining the value of the multiplier based on the rate of change of the gear ratio of the variator is further defined as defining the value of the multiplier to equal the minimum multiplier value when the rate of change of the gear ratio is substantially equal to zero (0).

8. The method as set forth in claim 2 wherein one of the first component and the second component includes a rotatable device rotatable about an axis at a variable rotational speed, and wherein defining the value of the multiplier based on the current operating conditions of the variator is further defined as defining the value of the multiplier to equal the maximum multiplier value when the rotational speed of the rotatable device is less than a pre-defined rotational speed.

9. The method as set forth in claim 8 wherein the pre-defined rotational speed of the rotatable device is equal to 110 rpm.

10. The method as set forth in claim 1 wherein the minimum multiplier value is equal to a value of 1.1, and the maximum multiplier value is equal to a value of 1.4.

11. The method as set forth in claim 1 wherein the variator is a continuously variable transmission having a primary pulley, a secondary pulley, and a belt rotating continuously about the primary pulley and the secondary pulley, with the first component being one of the primary pulley and the secondary pulley, and the second component being the belt, wherein each of the primary pulley and the secondary pulley include an axially fixed sheave and an axially moveable sheave, and wherein applying the commanded clamping pressure includes applying the commanded clamping pressure to the axially moveable sheave of one of the primary pulley and the secondary pulley to compress the belt between the axially moveable sheave and the axially fixed sheave at the commanded clamping pressure.

12. A method of controlling a continuously variable transmission having a primary pulley, a secondary pulley, and a belt rotating continuously about the primary pulley and the secondary pulley, with each of the primary pulley and the secondary pulley including an axially fixed sheave and an axially moveable sheave, the method comprising:
   calculating a theoretical clamping pressure;
   defining a multiplier based on current operating conditions of at least one of the primary pulley and the secondary pulley, wherein the multiplier includes a value that is variable between a minimum multiplier value and a maximum multiplier value;
   multiplying the theoretical clamping pressure by the defined value of the multiplier to define a commanded clamping pressure; and
   applying the commanded clamping pressure to at least one of the primary pulley and the secondary pulley to compress the belt between the respective axially moveable sheave and the axially fixed sheave at the commanded clamping pressure to transfer torque therebetween.

13. The method as set forth in claim 12 wherein the continuously variable transmission defines a variable gear ratio, and wherein defining the value of the multiplier based on the current operating conditions of at least one of the primary pulley and the secondary pulley is further defined as defining the value of the multiplier based on a rate of change of the gear ratio of the continuously variable transmission.

14. The method as set forth in claim 13 further comprising determining the rate of change of the gear ratio of the continuously variable transmission.

15. The method as set forth in claim 13 wherein defining the value of the multiplier based on the rate of change of the gear ratio is further defined as defining the value of the multiplier to include a higher value as the rate of change of the gear ratio increases.

16. The method as set forth in claim 13 wherein defining the value of the multiplier based on the rate of change of the gear ratio is further defined as defining the value of the multiplier to include a lesser value as the rate of change of the gear ratio decreases.

17. The method as set forth in claim 13 wherein defining the value of the multiplier based on the rate of change of the gear ratio of the continuously variable transmission is further defined as defining the value of the multiplier to equal the minimum multiplier value when the rate of change of the gear ratio is substantially equal to zero (0).

18. The method as set forth in claim 12 wherein defining the value of the multiplier based on the current operating conditions of the variator is further defined as defining the value of the multiplier to equal the maximum multiplier value when a rotational speed of the primary pulley and the secondary pulley is less than a pre-defined rotational speed.

* * * * *